United States Patent [19]

Coulthard

[11] 3,943,192

[45] Mar. 9, 1976

[54] ELASTOMERIC BLENDS

[75] Inventor: Douglas Coulthard, Sarnia, Canada

[73] Assignee: Polysar Limited, Sarnia, Canada

[22] Filed: Aug. 20, 1973

[21] Appl. No.: 389,520

Related U.S. Application Data

[63] Continuation of Ser. No. 212,701, Dec. 27, 1971, abandoned, which is a continuation-in-part of Ser. No. 799,934, Nov. 17, 1969, abandoned.

[30] Foreign Application Priority Data

Mar. 5, 1968 Canada ................................ 013997

[52] U.S. Cl. ........ 260/890; 260/28.5 B; 260/28.5 C; 260/829; 260/894
[51] Int. Cl.² .......................................... C08L 9/02
[58] Field of Search ............................ 260/890, 894

[56] References Cited
UNITED STATES PATENTS

| | | | |
|---|---|---|---|
| 2,540,596 | 2/1951 | Rehner, Jr. et al. ............... | 260/92.3 |
| 2,892,806 | 6/1959 | Moore ................................ | 260/890 |
| 2,901,448 | 8/1959 | Kraus ................................. | 260/887 |
| 3,400,086 | 9/1968 | Orr ..................................... | 260/894 |

Primary Examiner—Wilbert J. Briggs, Sr.
Assistant Examiner—J. Ziegler
Attorney, Agent, or Firm—Stevens, Davis, Miller & Mosher

[57] ABSTRACT

In the blending of a polymer of chloroprene with a lesser proportion of a diene/nitrile rubbery copolymer, a composition of much improved processing, as for example ease of handling on a mill and uniformity of mixing, is obtained when the nitrile copolymer is selected as a copolymer of about 55–80 mole % of a 2-alkyl butadiene-1,3 and about 20–45 mole % of an acrylic nitrile.

4 Claims, No Drawings

ELASTOMERIC BLENDS

This application is a continuation of application Ser. No. 212,701 filed Dec. 27, 1971 now abandoned which in turn is a continuation-in-part of application Ser. No. 799,934 filed Nov. 17, 1969 and now abandoned.

This invention relates to a blend of oil-resistant polymers. More particularly, it relates to a rubbery blend of chloroprene polymer and nitrile rubber.

It is known to mix chloroprene polymers with conventional nitrile rubbers, i.e. butadiene-acrylonitrile copolymers. Mixtures containing minor amounts of nitrile rubber are more resistant to oil than chloroprene polymers alone, but because of the difficulty of uniformly and intimately blending these two polymers, they are not widely accepted in the rubber industry. When handled in rubber processing equipment at conventional temperatures of about 80°C or above, chloroprene polymers tend to become less nervy, more plastic and extremely sticky. The conventional nitrile rubber, on the other hand, is non-plastic and dry; when combined a dispersion of discrete particles of nitrile rubber in the soft matrix of chloroprene polymer is formed rather than a homogeneous mixture. Such a dispersion is as sticky and therefore as poorly processable as the unblended chloroprene polymer. The physical properties of the vulcanized blend are often poorer than those of the chloroprene polymer alone even when good blending has been attained.

It is an object of this invention to provide a method of preparing a processable composition suitable for the production of oil-resistant vulcanizates. Another object is to provide an oil-resistant vulcanizate having improved physical properties.

In accordance with this invention, a method is provided of preparing a processable vulcanizable composition for the production of improved oil-resistant vulcanizates which comprises blending a major proportion by weight of a polymer of chloroprene and a minor proportion by weight of a rubbery copolymer of a 2-alkyl butadiene-1,3 and an acrylic nitrile.

The invention also provides an improved oil-resistant vulcanizate comprising a vulcanized composition containing a blend of a major proportion by weight of a polymer of chloroprene and a minor proportion by weight of a rubbery copolymer of a 2-alkyl butadiene-1,3 and an acrylic nitrile.

The polymer of chloroprene which can be used in accordance with this invention is a solid rubbery polymer, preferably soluble in aromatic hydrocarbon and chlorinated hydrocarbon solvents. It may be a homopolymer of 2-chlorobutadiene-1,3 or its copolymer with minor amount of a copolymerizable comonomer; the homopolymer is preferred. Two general types of chloroprene polymers are known: one is sulfur-modified and the other is non-sulfur-modified. Either of them can be used in this invention, and the choice will be governed by the end-use of the vulcanizate made therefrom. The vulcanizate properties are primarily determined by the type of chloroprene polymer since it is present in a major proportion to minor proportion of nitrile rubber.

The rubbery copolymer employed in a minor proportion by weight in admixture with the above chloroprene rubber is defined as the copolymer of a 2alkyl butadiene-1,3 and an acrylic nitrile. The alkyl substituent in the 2-alkyl butadiene-1,3 may be any alkyl radical containing 1 to 5 carbon atoms such as methyl, ethyl, isopropyl, and butyl. Representative examples of 2-alkyl butadiene-1,3 are isoprene and 2-ethyl butadiene-1,3. The acrylic nitrile which is present in the copolymer preferably in a minor proportion is an acrylic nitrile having the general formula

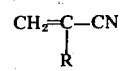

where R is hydrogen, $C_1$ to $C_3$ alkyl radical, halogen or cyanide. Representative examples are acrylonitrile, methacrylonitrile, and chloroacrylonitrile. The molar ratio of 2-alkyl alkadiene to acrylic nitrile preferably ranges from 55/45 to 80/20. Good results are obtained with a nitrile copolymer containing about 60 to 75 mole % of 2-alkyl butadiene-1,3 units, especially isoprene, and about 25 to 40 mole % of the acrylic nitrile units. The nitrile copolymer is a high molecular weight, normally solid polymer having a Mooney viscosity (ML-4' at 100°C) of about 40 to 150, usually in the range of 50 to 75.

In blending the chloroprene polymer and the above nitrile rubber, there is employed according to this invention a major proportion by weight of the chloroprene polymer with a minor proportion by weight of the nitrile rubber. The exact proportion will be chosen having in mind the specific vulcanized article to be manufactured and the specific chloroprene rubber to be used. In general, an amount of nitrile copolymer will be chosen such that the processability of the blend on a rubber mill is improved and dynamic properties of the vulcanizate maintained or improved while increasing the oil-resistance. For the nonsulfur-modified chloroprene rubber, this weight ratio may vary from about 10 to 35 parts nitrile per 90 to 65 parts chloroprene rubber, whereas for the sulfur-modified type, a somewhat higher amount of nitrile may be used. An overall typical ratio has been found to be about 25 parts nitrile rubber to 75 parts chloroprene rubber, especially where particular emphasis is placed on an improvement in processing. By "processing" is meant the ease of handling on a rubber mixing mill, the presence of tack and green strength, and the performance during sheeting, calendering, and handling operations.

The step of blending the chloroprene rubber and the above defined nitrile rubber may be performed on conventional rubber mixing equipment such as a two-roll open mill or an internal Banbury-type mixer. The actual order of addition of either polymer is not critical but the benefit of improved processing can be best realized if the two polymers are fed together into the mixer.

The 2-alkyl butadiene-1,3-acrylic nitrile copolymer disperses readily in the chloroprene polymer and upon mixing for a short time forms a uniform mixture which is free of visible particles of the unhomogeneously dispersed phase. The two polymers used in this invention are believed to be compatible, that is, mutually soluble on a nearly molecular scale. The minor amount of the nitrile copolymer homogeneously dispersed raises the cohesive strength of the chloroprene polymer to such a degree that the blend can be easily handled at conventional processing temperatures; it is less sticky, does not adhere to mill or calender rolls and can be conveniently sheeted to smooth sheets. When a visibly uniform mix is reached, then various compounding and vulcanizing ingredients may be added. Conventionally, these ingredients may be comprised of fillers such as clays, silica, titanium oxide, carbon black; softeners-plasticizers such as hydrocarbon oils, chlorinated oils, nonvolatile esters; natural and/or synthetic resins; antioxidants, stabilizers and vulcanizing agents such as zinc oxide, an oxide of a Group II metal of the Periodic Table, sulfur or their mixtures in combination with accelerators or retarders such as mercaptoimidazoline, diorthotolyl guanidine, benzothiaryl disulfide. The compounded stock thus prepared may be shaped and vulcanized in accordance with conventional practice to produce a desired article. The compositions of this rubber of isoprene/acrylonitrile having a nitrile content of 34 weight %, a Mooney viscosity (ML-4' 100°C) of 70, and a specific gravity of 0.96.

For the first blend 85 parts by weight of NEOPRENE type WRT were combined with 15 parts by weight of the isoprene/acrylonitrile copolymer, while for the second blend 70 and 30 parts, respectively, were combined.

Into each of the combined polymers were incorporated the following ingredients to give a typical general mechanical black moulding formulation. For comparison, a control was also run employing only the NEOPRENE type WRT without any nitrile copolymer.

| | Formulation | NEOPRENE Control | Blend 1 | Blend 2 |
|---|---|---|---|---|
| | (ingredients in parts by weight per 100 parts of combined polymers) | | | |
| Group A | magnesium oxide | 4 | 4 | 4 |
| | diphenylamine-diisobutylene reaction product | 2 | 2 | 2 |
| | a plastic coumarone-indene resin | 10 | 10 | 10 |
| | polyethylene (low melting point type) | 4 | 4 | 4 |
| | sulphur | — | 0.2 | 0.4 |
| | stearic acid | 1 | 1 | 1 |
| Group B | clay filler* | 40 | 40 | 40 |
| | fast extruding furnace-type carbon black | 30 | 30 | 30 |
| | medium thermal carbon black | 30 | 30 | 30 |
| | aromatic petroleum oil plasticizer | 10 | 10 | 10 |
| Group C | zinc oxide | 5 | 5 | 5 |
| | mercaptoimidazoline | 0.75 | 0.65 | 0.60 |
| | diorthotolyl guanidine | — | 0.20 | 0.40 |
| | benzothiazyl disulphide | 0.25 | 0.35 | 0.45 |

*Kaolin - hydrated aluminum silicate filler, 99% will pass 300 mesh sieve invention may be used to great advantage for the usual applications for neoprene rubbers, and include such uses as wire and cable jackets, footwear, roll covers, conveyor belting, hose covers, and various automotive and aeronautical moulded goods.

The invention is illustrated by means of the following examples.

EXAMPLE I

In this experiment, there were prepared two blends of (a) a polychloroprene rubber known under the trade name NEOPRENE type WRT and said to be a non-sulfur-modified chloroprene polymer having a specific gravity of 1.25, being soluble in aromatic and chlorinated hydrocarbons, and having a Mooney viscosity (ML-2½' 100°C) of 45; and (b) a nitrile copolymer The blending and compounding was performed on a Model B Banbury mixer a rotor speed of 77 r.p.m., a chamber temperature of 66°C starting with the steam and water shut off. The procedure followed was:

| | |
|---|---|
| At 0 minutes | Polymer(s) loaded followed by Group A ingredients of the compounding formulation |
| At 2 minutes | Group B ingredients added. Water turned on to cool rotor and chamber |
| At 4 minutes | Swept down |
| At 5 minutes | Discharged onto cool open-roll mill where Group C ingredients were added, and the mix refined |

Portions were then moulded, vulcanized for 30 minutes 166°C. Test specimens were subjected to a variety of tests listed in Table I with the test values therefor.

TABLE I

| Processing | Control | Blend 1 | Blend 2 |
|---|---|---|---|
| Compound Mooney (ML-4' at 100°C) | 37.5 | 35.5 | 34.5 |
| Scorch Time (minutes at 124°C) | 10.4 | 11.5 | 11.0 |
| Milling Behaviour | adhered to rolls | fair to good | good |
| Unaged Vulcanizate Properties | | | |
| Hardness, Shore $A_2$ | 69 | 70 | 71 |
| Modulus at 100% Elongation (kg/cm$^2$) | 38.7 | 38.7 | 33.8 |
| Tensile Strength (kg/cm$^2$) | 137.8 | 132.2 | 133.6 |
| Elongation at Break (%) | 320 | 340 | 340 |
| Tear Strength (kg/cm) | 6.5 | 8.3 | 10.4 |
| Abrasion Index (N.B.S. method)** | 46 | 46 | 47 |
| Resistance to Crack Growth,* final crack length (cm) | 1.3 | 0.8 | 0.5 |

TABLE I-continued

| Processing | Control | Blend 1 | Blend 2 |
|---|---|---|---|
| Aged Vulcanizate Properties | | | |
| *In Hot Air* | | | |
| (168 hours at 100°C) | | | |
| Change in Hardness (points) | +7 | +10 | +9 |
| Change in Modulus (%) | +50 | +45 | +40 |
| Change in Tensile (%) | +4 | +0 | −2 |
| Change in Elongation (%) | −8 | −14 | −12 |
| *In Oil* | | | |
| (ASTM Oil No. 3 for 70 hours at 100°C) | | | |
| Change in Hardness (points) | −23 | −22 | −20 |
| Change in Modulus (%) | −60 | −39 | −28 |
| Change in Tensile (%) | −50 | −34 | −31 |
| Change in Elongation (%) | −29 | −18 | −22 |
| Volume Change (%) | +49 | +41 | +34 |
| *In Reference Fuel B* | | | |
| (70 hours at room temperature) | | | |
| Change in Hardness (points) | −25 | −22 | −18 |
| Change in Modulus (%) | −55 | −43 | −32 |
| Change in Tensile (%) | −60 | −46 | −54 |
| Change in Elongation (%) | −35 | −22 | −33 |
| Volume Change (%) | +35 | +32 | +28 |

*(Ross flex method, original crack width 0.25 cm, flexed for 3,000,000 cycles)
**ASTM D 1630-61

Compounds of Blends 1 and 2 had a lower Mooney viscosity than the control compound; they also showed a markedly improved milling behaviour in contrast to the unblended polychloroprene compound which was extremely sticky and difficult to form into a sheet. On visual inspection of thinly sheeted sheets and cut edges, compounds of Blends 1 and 2 were completely uniform and homogeneous without any evidence of undispersed particles.

The vulcanizates of Blend 1 and 2 compounds showed a significant improvement in tear strength, resistance to crack growth (i.e. flex life) and oil-resistance, the properties which are important in applications such as belting, hose and packing. In other physical properties, such as tensile strength, modulus, elongation, hardness, abrasion resistance, ozone resistance (not shown in the table), ageing in hot air, Blend 1 and 2 compounds are equivalent to Control compound.

EXAMPLE II

A further set of blends was prepared and evaluated as in Example I except that the polychloroprene rubber was a sulfur-modified type known under the trade name of NEOPRENE type GN and said to have a specific gravity of 1.23, be soluble in aromatic and chlorinated hydrocarbons, and to have a Mooney viscosity (ML-2½ 100°C) of 60. The same isoprene/acrylonitrile copolymer as described in Example I was used.

One blend contained 80 parts by weight of NEOPRENE GN polymer and was combined with 20 parts by weight of the isoprene/acrylonitrile copolymer, while a second blend was prepared using a ratio of 60/40. A control compound employing only the NEOPRENE polymer was also made.

The type and amounts of compounding ingredients used were the same as for the formulation given in Example I, except that in Group B ingredients, the 10 parts of aromatic petroleum oil was substituted by 15 parts of dioctyl phthalate, and the following amounts of Group C ingredients were used (in parts by weight per 100 parts of combined polymers):

| Compound | Control | Blend 3 | Blend 4 |
|---|---|---|---|
| Zinc oxide | 5 | 5 | 5 |
| Mercaptoimidazoline | 0.1 | 0.2 | 0.4 |
| Benzothiazyl disulphide | — | 0.2 | 0.4 |

The same mixing cycle was employed, and again portions were vulcanized for 30 minutes 166°C. The test values are listed in Table II.

TABLE II

| Processing | Control | Blend 3 | Blend 4 |
|---|---|---|---|
| Compound Mooney Viscosity (ML-4' at 100°C) | 38.0 | 35 | 37.0 |
| Scorch Time (minutes at 124°C) | 5.6 | 7.8 | 7.3 |
| Milling Behaviour | sticky | good | good |
| Unaged Vulcanizate Properties | | | |
| Hardness, Shore $A_2$ | 79 | 77 | 77 |
| Tensile Strength (kg/cm$^2$) | 129.4 | 130.1 | 132.9 |
| Compression Set (%)* | 42 | 40 | 38 |
| Resistance to Crack Growth,** final crack length (cm) | 1.4 | 1.4 | 1.0 |
| Ozone Resistance*** | | | |
| Time to first cracks while at 20–30% extension (hours) | 48 | 48 | 48 |
| Threshold Strain (%) | 18 | 18 | 18 |
| Aged Vulcanizate Properties | | | |
| *In Hot Air* | | | |
| (168 Hours at 100°C) | | | |

TABLE II-continued

| Processing | Control | Blend 3 | Blend 4 |
| --- | --- | --- | --- |
| Change in Hardness (points) | +6 | +8 | +7 |
| Change in Tensile (%) | +6 | 0 | +8 |
| In Oil | | | |
| (ASTM Oil No. 3 for 70 hours at 100°C) | | | |
| Change in Hardness (points) | −27 | −22 | −19 |
| Change in Tensile (%) | −38 | −35 | −26 |
| Volume Change (%) | +44 | +37 | +26 |
| In Reference Fuel B | | | |
| (70 hours at room temperature) | | | |
| Change in Hardness (points) | −18 | −11 | −10 |
| Change in Tensile (%) | −45 | −28 | −33 |
| Volume Change (%) | +38 | +32 | +26 |

*ASTM method B, 70 hours at 100°C
**Ross flex method, original crack width 0.25 cm, flexed for 3,000,000 cycles
***ASTM D 1171-61

Once again, the beneficial improvements in processing, as noted in Example I, were observed for Blends 3 and 4. A greater margin of safety against the onset of scorch was possible with the compounded Blends 3 and 4 than with the Control compound.

The results given in Table II again confirm that the benefits in processing were achieved without a significant sacrifice in vulcanizate properties. This can be seen by the maintenance of properties such as hardness, tensile and ozone resistance, with an improvement in compression set and flex life. Ageing of the vulcanizates in hot air showed no adverse effect while ageing in oil of blends containing isoprene/acrylonitrile copolymer was markedly improved.

What is claimed is:

1. A chloroprene polymer composition of improved processabiity comprising a blend of (A) about 90–65 parts by weight of a rubbery chloroprene polymer and (B) about 10–35 parts by weight of rubbery copolymer of 55–80 parts by weight of a 2-alkyl butadiene-1,3 where the alkyl group contains 1–5 carbon atoms with 45–20 parts by weight of an acrylic nitrile of the general formula $CH_2 = C(R) - CN$ where R is selected from hydrogen, $C_1$–$C_3$ alkyl, halogen and cyano radicals.

2. A composition as claimed in claim 1 wherein the chloroprene polymer is a homopolymer of chloroprene.

3. A composition as claimed in claim 2 wherein the rubbery copolymer of (B) is a copolymer of isoprene and acrylonitrile.

4. A vulcanizate of the compositon of claim 3.

* * * * *